UNITED STATES PATENT OFFICE.

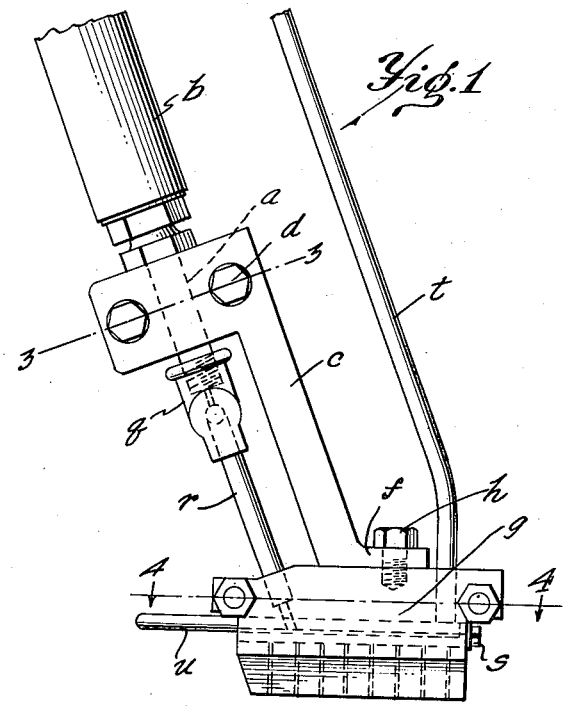
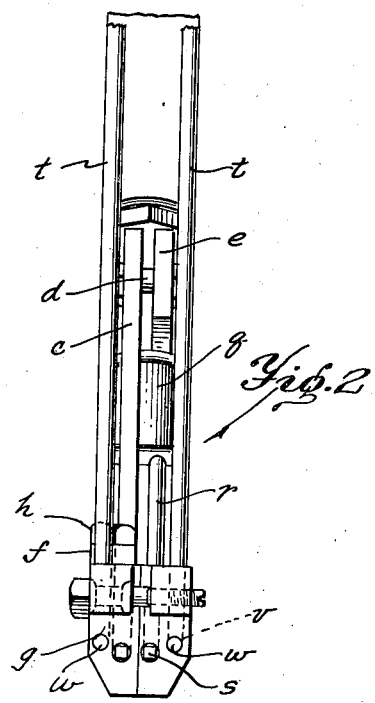
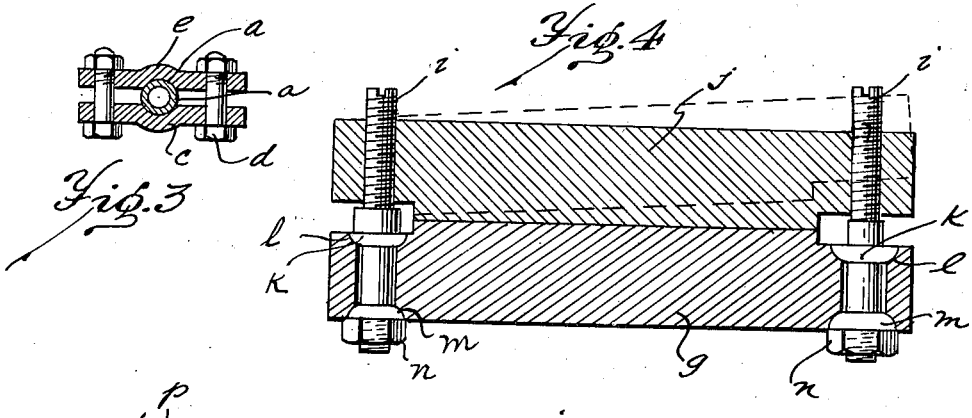
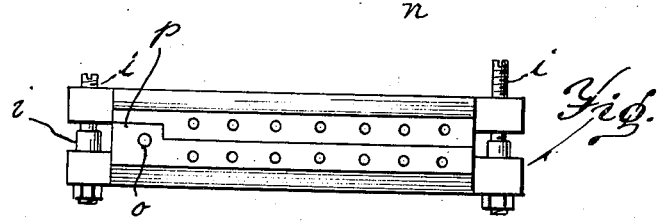

SIMON BERG, OF DETROIT, MICHIGAN, ASSIGNOR TO MICHIGAN STEEL TUBE PRODUCTS COMPANY, OF DETROIT, MICHIGAN, A CORPORATION OF MICHIGAN.

WELDING-TIP.

1,390,423.

Specification of Letters Patent. Patented Sept. 13, 1921.

Application filed June 3, 1920. Serial No. 386,400.

*To all whom it may concern:*

Be it known that I, SIMON BERG, a citizen of the United States, residing at Detroit, in the county of Wayne and State of Michigan, have invented certain new and useful Improvements in Welding-Tips, of which the following is a specification.

This invention relates to torches, and has for its object a torch tip provided with a pair of lines of welding jets suitable for use with tubing of varying diameters and conditions. In the co-pending application of Richard O. Berg, No. 378,251, an improvement in the art of welding by the use of two lines of welding jets striking the tube at opposite sides of the edges of the tubing is described and claimed. With tubing having varying diameters and varying thicknesses of metal different spacing between the lines of jets is desirable. In order to obtain this in the torches heretofore constructed it has been necessary to substitute a new tip to meet each new condition.

It is the object of the present invention to provide a tip which can be made to accommodate itself to varying conditions met with in different tubing. It is also possible to make the two lines of jets slightly convergent from front to back for the purpose of assuming an angle similar to the angle of the edges of the tubing as they converge together. This will more fully appear in the description following.

In the drawings,—

Figure 1 is a side elevation of the torch equipped with my improvement.

Fig. 2 is an elevation taken from the front of the torch.

Fig. 3 is a section on the line 3—3 of Fig. 1.

Fig. 4 is a section on the line 4—4.

Fig. 5 is a bottom plan view.

$a$ designates the usual stem or plug member that screws into the torch $b$ and upon the threaded end of which is ordinarily screwed the burner tip. Instead of screwing the burner tip directly on the stem $a$ an extension $c$ is clamped thereto by the bolts $d$ and the clamping plate $e$. This extension is provided with a foot $f$ secured to the stationary tip or block section $g$ by the cap screw $h$.

It will be seen by referring to Figs. 2 and 5 that the tip is a block divided into two sections which are bolted together by the studs $i$ of a peculiar construction. They comprise a threaded portion which passes through the movable section $j$ and an integral collar $k$ which has a spherical surface adapted to engage in the spherical countersunk portion $l$ of the stationary section $g$. $m$ designates a loose collar having a similarly formed spherical contact surface and engaging with a similarly formed countersunk portion. $n$ represents a nut on the end of the stud $i$.

By turning the studs $i$ with a screwdriver the two tip sections $g$ and $j$ may be caused to approach or separate from each other and give the necessary space between the lines of jet orifices. It will be seen by the exaggerated dotted line showing in Fig. 4 that the diverging or converging relation between the lines of jet orifices may be secured by turning one screw stud farther than the other. This is a desirable condition where it is desirable to make the lines of welding jets exactly parallel the converging meeting edges of the tubing as they come together between the pressure rolls.

In Fig. 5 a plan view of the bottom of the tip is shown. As here shown, the plug is provided with an offset portion $p$ which carries a single jet orifice $o$, which is described in the previous application of Richard O. Berg as being used at the end of the torch tip for the purpose of directing the jet substantially on the seam and smoothing down the ridge that would otherwise be formed by reason of the metal being flowed together from opposite sides by the two lines of jets.

The mixture of oxygen and acetylene is effected in the ordinary way in the burner casing $b$ or preferably in the stem or plug $a$. This being no part of the invention, the same is not shown.

The T fitting $q$ screws on to the end of the stem or plug $a$ and a pair of flexible copper pipes $r$ run to the two sections $g$ and $j$ of the tip that are silver-soldered into the T head fitting and also into the tip sections. The tip sections are provided with suitable distributing chambers or passageways closed by the screw plugs $s$ for the mixture. The flexible copper pipes $t$, two in number, lead into the front of the tip sections and serve one as an incoming pipe for the cooling water and the other an outgoing pipe. The loop of flexible copper pipe $u$ at the rear of the tip connects the two water distributing passage-ways $v$ of the two tip sections. w, w are plugs for closing the ends of these passage-ways.

From the above description it will be seen that a tip provided with a double line of jet orifices is provided and that the lines of jet orifices may be spaced at will suitable for varying conditions met with in different tube; also that a slight diverging and converging relation between the lines of the jet orifices may be readily secured where this is desirable. This tip is provided with an extension clamp that permits it to be fastened to the regular burners and plugs or stems used on the conventional forms of torches.

What I claim is:

1. In a torch, the combination of a stem, an extension clamp which can be secured thereto, a two-section block tip one of whose sections is secured to the end of the extension, and means for adjustably securing the other section directly to the first-mentioned section.

2. In a torch, the combination with a welding torch of an extension clamp secured thereto, a two-section block tip one of whose sections is secured to the end of the extension, means for adjustably securing the other section directly to the first-mentioned section, and means for dividing the mixture taken from the torch and leading a portion to each section of the tip.

3. In a torch, the combination of a casing provided with a stem projecting therefrom, an extension clamp secured thereto, a two-section tip one of whose sections is secured to the end of the extension clamp, means for adjustably securing the other tip section to the first-mentioned tip section, means for dividing the mixture taken from the end of the stem and leading a portion to each tip section, and means for leading a cooling medium through one section and then transferring it to the other section and out of the same.

4. A torch tip, comprising two sections each of which is provided with a plurality of jet orifices arranged in a line, and means for adjustably spacing the said tip sections.

5. A torch tip, comprising a pair of sections each of which comprises a plurality of jet orifices arranged in a line, and means for adjustably spacing the sections so as to space the lines of jet orifices either in parallel relation or in diverging or converging relation.

6. A torch tip, comprising a pair of sections each of which is provided with a plurality of jet orifices arranged in a line, and means for spacing the sections comprising a stud inserted into one section and rotatably but immovably longitudinally secured in the other section.

7. A torch tip, comprising a pair of sections each comprising a line of jet orifices, and means for adjustably spacing the two tip sections comprising a pair of threaded studs at opposite ends of the sections, said studs being threaded into one section and rotatably but immovably longitudinally arranged in the other section.

8. A torch tip, comprising a pair of sections each having a line of jet orifices, and means for adjustably spacing the sections, comprising a stud having a threaded engagement with one section, and a pair of spherical contact surface collars in engagement with complementary portions on the other section whereby the sections may be spaced angularly with respect to each other.

9. A torch tip, comprising a pair of sections, and means for spacing the two sections including a pair of studs at opposite ends of the section each having a threaded engagement with one section, and a pair of spherical contact face collars adapted to engage with complementary portions of the other section.

10. A torch tip, comprising a block divided longitudinally into two sections, distributing chambers, and orifices in each section, and adjustable clamping and spacing between the two block sections.

11. A torch tip, comprising a block divided longitudinally into two sections, one or more jet orifices in each section, distributing chambers and water cooling passages in each section.

12. A torch tip, comprising a block divided longitudinally into two sections, one or more jet orifices in each section, a distributing chamber in each section, and means engaging the two block sections for adjustably spacing the sections laterally with respect to each other.

13. A torch tip provided with a block divided longitudinally into two sections, one or more jet orifices in each section, a distributing chamber in each section, a cooling liquid passage in each section, and means for adjustably spacing the sections laterally with respect to each other.

14. A torch tip provided with a block divided longitudinally into two sections, a line of jet orifices in each section, a distributing chamber in each section, and means for spacing the sections laterally with respect to each other.

15. A torch tip provided with a block divided longitudinally in two sections, a line of jet orifices in each section, one of the sections provided with an offset portion and the other with a complementary recess, the offset portion accommodating an intermediate jet orifice located intermediate the two lines of jet orifices, and means for adjustably spacing the tip sections laterally with respect to each other.

In testimony whereof I affix my signature.

SIMON BERG.